United States Patent [19]
Heeb

[11] 3,970,281
[45] July 20, 1976

[54] VACUUM VALVE CONSTRUCTION
[75] Inventor: Anton Heeb, Mauren, Liechtenstein
[73] Assignee: Balzers Patent und Beteiligungs AG, Liechtenstein
[22] Filed: Mar. 24, 1975
[21] Appl. No.: 561,621

[30] Foreign Application Priority Data
Mar. 29, 1974 Switzerland.......................... 4387/74

[52] U.S. Cl................................. 251/77; 251/158
[51] Int. Cl.²....................................... F16K 31/44
[58] Field of Search ............... 251/77, 78, 158, 319

[56] References Cited
UNITED STATES PATENTS
833,303   10/1906   Clark ................................. 251/158

Primary Examiner—Henry T. Klinksiek
Attorney, Agent, or Firm—McGlew and Tuttle

[57] ABSTRACT

A vacuum valve comprises a housing having an inlet passage and a discharge passage with a valve seat defined within the housing between the inlet and discharge passages. A valve disc is engageable on the seat to close off the communication between the valve inlet passage and the discharge passage. An extension is formed on the top face of the valve disc adjacent each side edge and a lever member has an arm portion at each side which engages through the extension and which is receivable in a groove defined in the housing above the valve seat. A valve drive member is connected to move the valve disc toward and away from its seat and during the closing movement it acts on the lever member centrally to cause the outer arm portions to move outwardly and engage into the receiving groove and to both hold the valve against withdrawal from the valve seat and to aid in its pressing down against the seat in tight sealing engagement therewith. In one form of the invention the lever member comprises a leaf spring having a central upwardly extending portion which bears against a shoulder of a valve lift rod which forms the valve drive member. In the closed position the valve lift rod is biased by a compression spring against the central portion of the lever to cause compression of the lever which advantageously is a leaf spring and the outward extension of its arms into the receiving groove and the tight sealing engagement of the disc on the valve seat. The central cam is arranged below the central portion of the lever which causes a spreading of the arms during the closing movement. In another embodiment the arms are biased by cup springs outwardly away from the disc toward engagement with a drive cam plate. Pressure applied by the cam plate causes an outward movement of the outer ends of the lever to engage into the receiving grooves.

9 Claims, 10 Drawing Figures

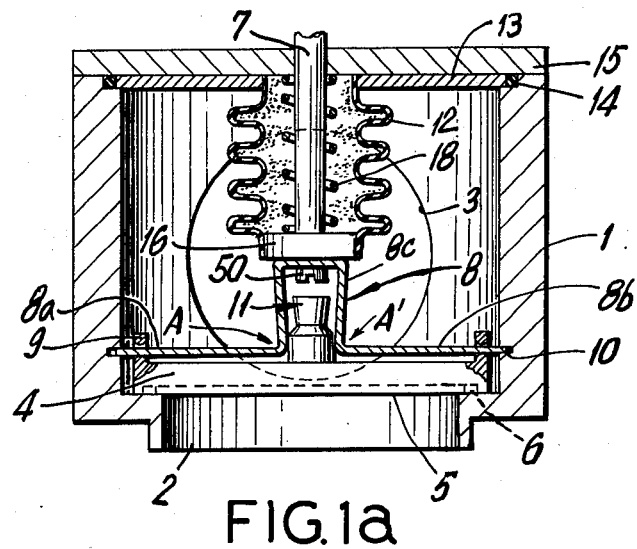
FIG.1a
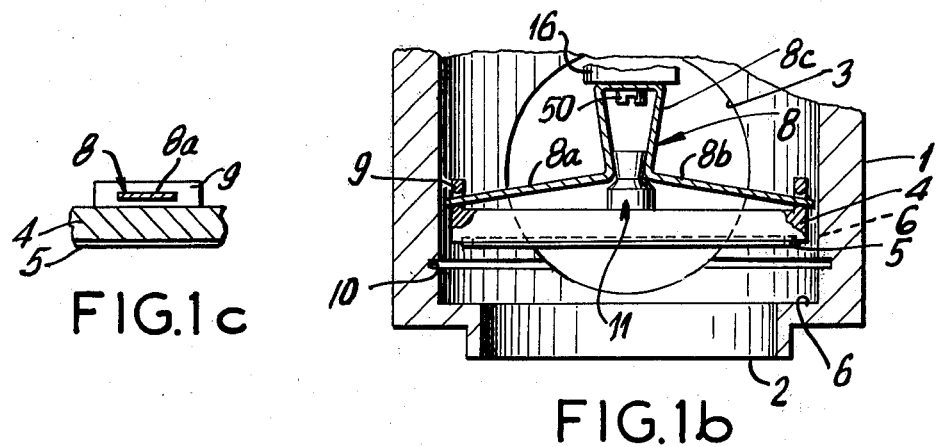
FIG.1c
FIG.1b
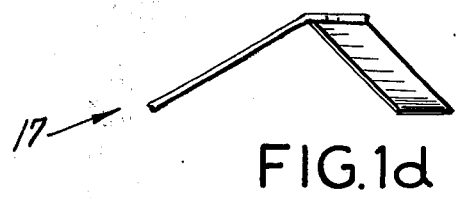
FIG.1d
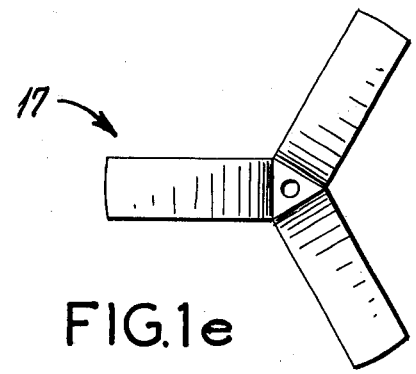
FIG.1e

VACUUM VALVE CONSTRUCTION

DESCRIPTION OF THE PRIOR ART

In vacuum valves the pressure with which the valve shutter which in larger valves is usually designed as a disc, is applied against the valve seat must be sufficiently high in order to insure sufficient tightness sometimes even against atmospheric pressure alone. In order to be able to produce a high closing pressure in valves having large diameters and therefore also insure a long sealing line along the circumference very high contact pressures are needed. That is why the driving mechanism used for vacuum lift valves are in most cases worm gear spindles or pneumatic actuators and for vacuum slide valves bell cranks having to produce a sufficiently high contact pressure.

The present invention deals particularly with a vacuum valve which is capable of effecting a closing pressure with the aid of only a small actuating force. In a vacuum valve of this kind the movable intermediate member is designed as a lever adapted to press the valve shutter against the valve seat. Such movable intermediate members between a valve lifter and a valve shutter are known in themselves. For example, a resilient connection is known permitting a certain lateral and tilting movement of the valve shutter during the valve closure in order to make possible an automatic centering of the valve plate and a uniform contacting of the valve seat or in order to obtain an after travel of the valve lifter at the closure of the valve.

SUMMARY OF THE INVENTION

The present invention is an improvement over the prior art in the construction of a valve having a movable connection in the form of a shutting lever which effects a sufficient contact pressure on the valve shutter or disc while using a relatively small force at the driving member. Consequently the force producing and the force transmitting members can be designed with smaller dimensions with the resultant simpler construction and substantially lower cost. For example in pneumatic driving mechanism smaller piston diameters can be provided.

Due to the diminution of the driving members the space necessary for the valve is reduced. In addition the inventive construction makes it possible to construct a valve with other portions of simpler construction such as the safety mechanisms which may be required for closure of the valve during failure of the energy or compressed air supply or for keeping the valve closed tight during a pressure increase in the valve casing, since the force needed for the actuation of the valve is reduced.

Accordingly it is an object of the invention to provide a vacuum valve which comprises a valve housing having a flow passage therethrough with a valve seat for closing off the passage which is closed by a valve shutter or disc member having an extension at each side with an opening therethrough for accommodating a lever member which during closing is compressed by a driving member against the valve shutter so as to cause its end portions to project outwardly from each side of the shutter into a receiving groove defined in the housing.

A further object of the invention is to provide a valve construction which is simple in design, rugged in construction and economical to manufacture.

For an understanding of the principles of the invention, reference is made to the following description of typical embodiments thereof as illustrated in the accompanying drawings.

BRIEF DESCRIPTION OF THE DRAWINGS

In the Drawings:

FIG. 1a is a transverse sectional view of a valve constructed in accordance with the invention;

FIG. 1b is a view similar to FIG. 1 but with the valve in an open position;

FIG. 1c is a partial sectional view of the valve shutter shown in FIG. 1a;

FIG. 1d is a partial sectional view of another embodiment of the valve holding lever;

FIG. 1e is a top plan view of the holding lever shown in FIG. 1d;

FIG. 2b is a top plan view of the valve shown in FIG. 2a;

GENERAL DESCRIPTION OF PREFERRED EMBODIMENTS

Figure 2A:
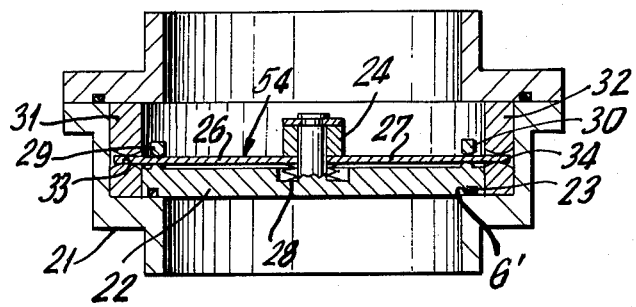
FIG. 2a is a view similar to FIG. 1 of another embodiment of the invention.

Referring to the drawings in particular the invention embodied therein in FIGS. 1a, 1b and 1c comprises a vacuum valve having a valve housing 1 having two connecting ports 2 and 3 which for example define an inlet passage and a discharge passage which communicate with each other through an opening defined within an annular valve seat 6 defined at the interior of the housing. A valve disc or shutter 4 carrying an annular gasket 5 at its underside bears against the seat 6 in a closing position as indicated in FIG. 1a in order to close the communicating passage between the inlet and the outlet ports.

In accordance with the invention valve lever means or a lever holding spring 8 is disposed between a drive member in the form of a valve rod having an end disc portion or shoulder 16 and the valve shutter 4. The shutter 4 is advantageously provided with an upstanding lug or extension 9 at each side having an opening therethrough through which leg portions 8a and 8b of the valve lever member 8 extend. In the closed position a central or U-shaped portion 8c of the lever member 8 is pressed or biased in a direction toward the valve shutter 4 by the force of the valve lift rod 7 which is aided by a biasing force of a compression spring 18 which extends around the rod 7 between the shoulder 16 and a top cover 15 of the housing. This pressure causes a flattening of the arm portions 8a and 8b from the condition shown in FIG. 1b to the flattened condition shown in FIG. 1a in which the ends extend into a receiving groove 10 which is defined in alignment with the ends of the arm portions 8a and 8b and which in the embodiment shown comprises an annular groove.

The top of the housing is sealed by a flange plate 13 which holds one end of a bellows seal cover 12 which has an opposite end secured on the shoulder 16. The flange is sealed in position by means of a seal ring 14. The central U-shaped portion of the lever member 8 is advantageously bolted to the shoulder 16 by means of a bolt 50.

The engagement of the ends of the arm portions 8a and 8b into the recesses or groove 10 takes place at the instant the valve disc applies against the valve seat 6. Upon moving the valve lifting rod member further downwardly the recesses 10 act as abutments and the two arms of the spring 8 act as levers applying against the slots in the extensions 9 and they thereby act to press the valve shutter 4 against the valve seat 6. Because the lever member 8 is constructed as a leaf spring with at least a portion thereof being resilient the downward action of the lift rod 7 against the spring will cause a resilient springing outwardly of the leg portions 8a and 8b in the final position indicated in FIG. 1a. Thus a step-up force transmission is obtained corresponding to the ratio of the distance between points A and A' and the associated fulcrums 10 to the distance between extensions 9 and the fulcrums 10. Transmission ratios up to 8:1 are easily obtainable.

In accordance with a feature of the invention cam means generally designated 11 are disposed centrally of the shutter valve 4 and it includes an upper substantially trapezoidal portion which engages with the lower end of the U-shaped part 8c as shown in FIG. 1b when the valve is opened and a lower widened base portion which engages within the U-shaped portion 8c to urge the legs 8a and 8b outwardly in the closed position of FIG. 1a. The construction insures a positive spreading motion of the arms 8a and 8b to engage in the respective recesses or annular groove 10.

The valve lifting rod 7 is hermetically sealed against the interior of the valve casing. This is effected by the bellows 12 in the seal 14 at the cover 15. The opposite end of the bellows 12 is sealed at the shoulder 16.

The compression spring 18 acts to close the valve automatically as soon as for example the force acting on the valve fails to keep the valve open through the action of the valve lifting rod 7. This could happen for example in an electromagnetically actuated valve due to power failure. Because the contact pressure between the valve shutter and the valve seat 6 can be effected due to the step-up force transmission by means of a relatively small spring which can be easily accommodated within the bellows 12, the overall height of the valve can be substantially reduced. The assemblage is also simplified when the biasing force which must act on the lever arm member 8 to hold the valve disc down is very small. The maintenance as far as it requires a disassembling and a reassembling of the valve is thereby also substantially facilitated by the construction employed. Step-up force transmission which is produced by the construction of the lever member 8 permits the valve to be easily closed and easily opened even against the atmospheric pressure.

The extensions 9 may be formed in the simplest manner by projecting a circular edge at the periphery of the valve disc 4. Also instead of the extensions radial grooves may be provided directly on the disc 4 for accommodating leaf springs in a manner that permits their outward sliding movement but prevents any lateral deflection thereof. Instead of a leaf spring having two end portions operating as levers a spring star having a plurality of arms may be used. FIG. 1d and 1e show such a construction in the form of a three-armed spring leaf 17 which may be secured to the shoulder 16 of the lift rod 7 instead of the U-shaped lever member 8 which is shown in FIG. 1.

The movable connection between the valve shutter 4 and the drive member 7 does not have to be resilient such as in the construction of FIG. 1. A rigid bar movably connected to the driving member may also be used as a valve shutting lever for purposes of the invention. It would also be satisfactory to make the lever member 8 with only the portions designated A and A' resilient. However, fully resilient lever arms 8a and 8b offer the advantage of a so-called after travel action that is the possibility that upon closure of the valve the driving member will still be able to cover a certain travel distance and this may be used for actuation of an electric switch and thus for the indication of the effective valve closure. In the inventive valve however a certain after travel is obtained also because of the fact that after the valve disc has hermetically applied against the valve seat a further small compression of the sealing is possible in addition. This results in a sufficiently extended after travel corresponding to the step-up ratio of the valve lever member 8.

Figure 2B:
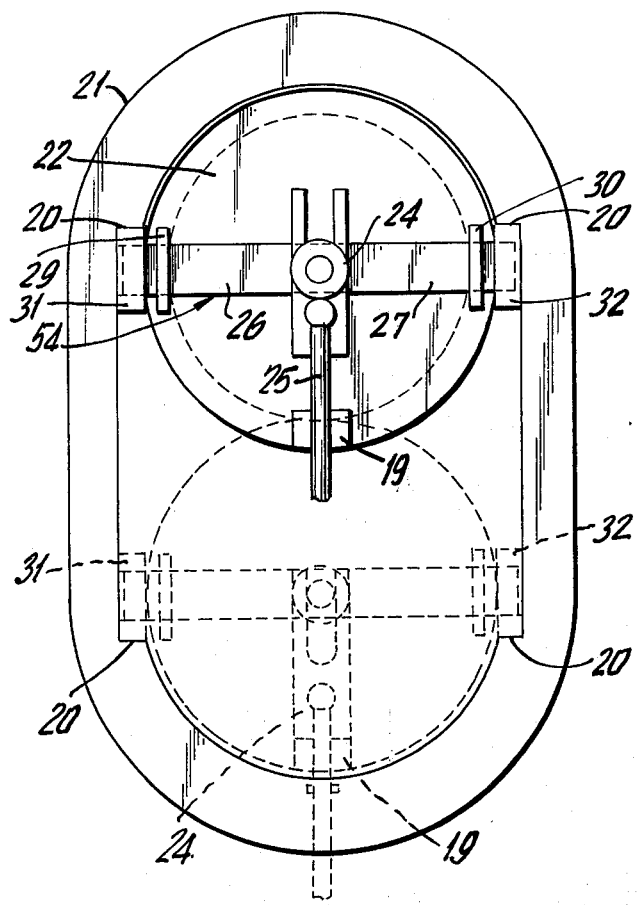

In the embodiment shown in FIGS. 2a and 2b the vacuum valve comprises a valve casing 21 having a valve disc 22 with a seal ring 23 which is seated on a seat formation 6' of the housing. The driving member comprises a cam plate 24 of a cam gear which is actuated by means of a bar 25. The lever member generally designated 54 is urged against a valve disc or shutter 22 by the drive plate 24. The lever member 54 includes two lever arms 26 and 27 which are urged against the force of a biasing spring 28 against the disc 22 so that their ends move outwardly into openings 33 and 34 at respective ends and which are defined in receiving bodies 31 and 32. The two lever arms 26 and 27 are advantageously formed of a leaf spring. The cup springs 28 make it possible to open the valve against the atmospheric pressure even in case the spring force of the leaf springs 26 and 27 would be too small. Extensions 29 and 30 are on each end of the disc 22. The bodies 31 and 32 define a slideway which serve as carriers and sliding guides for the valve disc shown in FIGS. 2a and 2b to permit sliding movement of the valve disc 22 with the carrier guide from the closed position shown in solid lines in FIG. 2b to the open position shown in dotted lines. Stops 20, 20 are provided for limiting movement of the bodies 31 and 32. A further stop 19 stops movement of the cam plate 24 beyond 19 to force movement of the disc 22. Part 19 acts as a guide for the actuating bar 25 and prevents any jamming.

Figure 3:
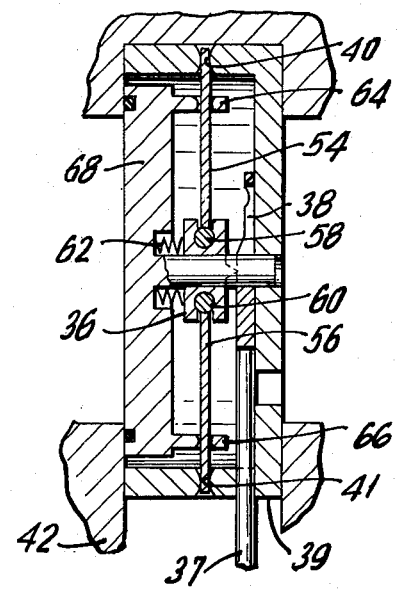
FIG. 3 is a view similar to FIG. 1a of another embodiment of the invention with the valve shown in an upright or vertical position.
Figure 2C:
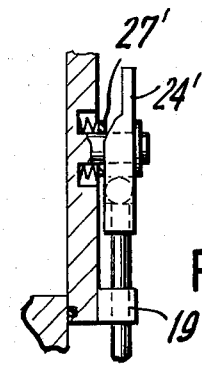
FIG. 2c is a partial sectional view of another construction of valve shutter and a lever member.
Figure 2D:
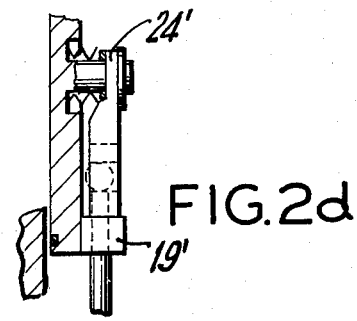
FIG. 2d is a view similar to FIG. 2c of still another construction of valve shutter and holding member.

In the construction shown in FIGS. 2c and 2d an alternate embodiment is shown for the construction in which the valve slides from the open to the closed position similar to FIGS. 2a and 2b. In this arrangement similar parts are similarly designated but with primes. FIG. 2c shows the closing position and FIG. 2d shows the open position of the valve. In the embodiment of FIG. 3 lever members 54 and 56 are designed as rigid bars. The bars 54 and 56 are movably connected to a driving member 36 by means of ball joints 58 and 60. Driving member 36 is actuated by a stroke bar 37 acting through a cam plate 38. A yoke 39 is provided with abutments 40 and 41 for the actuation of the levers 37. The cam plate 38 is closed at the upper end so that when part 37 is drawn downwardly the closed end bears on the stem of disc 68 to draw the yoke and disc from over the valve port. The valve casing is designated 42 and it has recesses or grooves 40 and 41 therein for accommodating the rigid lever arms 54 and 56. The drive member 37 compresses the driving member 36 against spring 62 to move the outer ends of the arms 54 and 56 through the extensions 64 and 66 into the receiving grooves 40 and 41 and a release of the drive member 36 permits the spring 62 to act on the drive member so as to permit the arms 54 and 56 to pivot thereon and move out of the receiving recesses 40 and 41 as the drive member 36 moves away from the valve disc 68.

While specific embodiments of the invention have been shown and described in detail to illustrate the application of the principles of the invention, it will be understood that the invention may be embodied otherwise without departing from such principles.

What is claimed is:

1. A valve construction comprising a valve housing having an inlet passage and a discharge passage, a valve seat defined within said housing between said inlet passage and said discharge passage, a valve disc engageable on said valve seat to close the communication between said valve inlet passage and said valve discharge passage, said valve disc having a top surface with opposite upright extensions adjacent its respective sides each with an opening therethrough, a drive member movable to move said valve disc toward and away from said seat, means defining a cam lever receiving groove spaced from said seat alongside the extension openings when said valve disc is engaged on said valve seat, a cam lever having a central portion connected to said drive member and disposed between said drive member and said valve disc and including a lever arm portion on each side extending through the respective openings of said each extension and being engageable in the receiving grooves during closing movement.

2. A valve according to claim 1, wherein said cam lever means comprises a single lever member having a plurality of arms extending outwardly, said extensions corresponding in number to the number of arms of said lever member.

3. A valve according to claim 1, wherein said cam lever means comprises first and second lever arms, said drive member comprising a cam plate overlying said first and second lever arms and spring means biasing said first and second lever arms toward said cam plate.

4. A valve according to claim 3, wherein said housing includes a slideway, a drive member on each side of said valve disc having openings therein defining a receiving groove on each side of said valve disc for receiving said lever arm means, said guide member being slidable along said slideway to move said valve disc from a closed position to an open position in which said valve disc is offset from the valve seat.

5. A valve according to claim 3, wherein said first and second lever arms are rigid members, said drive member being displaceable toward and away from said valve disc and having a ball socket formation for each of said lever arms, said lever arms having ball members pivoted in said ball socket portions to permit movement of said lever arms.

6. A valve construction comprising a valve housing having an inlet passage and a disclosure passage, a valve seat defined within said housing between said inlet passage and said discharge passage, a valve disc engageable on said valve seat to close the communication between said valve inlet passage and said valve discharge passage, said valve disc having a top surface with opposite upright extensions adjacent its respective sides each with an opening therethrough, a drive member movable to move said valve disc toward and away from said seat, means defining a cam lever receiving groove spaced from said seat alongside the extension openings when said valve disc is engaged on said valve seat, cam lever means disposed between said drive member and said valve disc and including a lever arm portion on each side extending through the respective openings of said each extension and being engageable in the receiving grooves during closing movement, said lever arms being formed as arm portions of a lever member, said lever member including a resilient portion.

7. A valve construction comprising a valve housing having an inlet passage and a discharge passage, a valve seat defined within said housing between said inlet passage and said discharge passage, a valve disc engageable on said valve seat to close the communication between said valve inlet passage and said valve discharge passage, said valve disc having a top surface with opposite upright extensions adjacent its respective sides each with an opening therethrough, a drive member movable to move said valve disc toward and away from said seat, means defining a cam lever receiving groove spaced from said seat alongside the extension openings when said valve disc is engaged on said valve seat, cam lever means disposed between said drive member and said valve disc and including a lever arm portion extension through the respective openings of said each extension and being engageable in the receiving grooves during closing movement, said drive member comprising a valve lift rod, said cam lever means comprising a cam lever having a central portion connected to said lift rod and having a leg portion on each side engageable into the receiving groove and including a spring action on said lift rod urging it against said cam lever means and said valve disc.

8. A valve according to claim 7, including a cam between said valve disc and said cam lever means forming means urging said lever arms outwardly to engage in the respective receiving grooves.

9. A valve according to claim 8, wherein said cam includes a widened base portion and an upper portion of lesser width, said cam lever means comprising a leaf spring having a central U-shaped portion and an arm portion on each side of said central U-shaped portion, said central U-shaped portion straddling said cam and engaged on the widened base portion of said cam in a closed position to spread said arm portions outwardly.

* * * * *